United States Patent
Dontcheva et al.

(10) Patent No.: US 7,383,495 B2
(45) Date of Patent: Jun. 3, 2008

(54) PRESENTATION VIEWING TOOL DESIGNED FOR THE VIEWER

(75) Inventors: Lubomira A. Dontcheva, Seattle, WA (US); Steven Drucker, Bellevue, WA (US); Michael F. Cohen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 500 days.

(21) Appl. No.: 11/057,997

(22) Filed: Feb. 15, 2005

(65) Prior Publication Data

US 2006/0184872 A1  Aug. 17, 2006

(51) Int. Cl.
*G06F 17/00* (2006.01)
(52) U.S. Cl. .................................. 715/200
(58) Field of Classification Search ............... 715/500, 715/512, 730, 732, 200, 230, 710
See application file for complete search history.

(56) References Cited

U.S. PATENT DOCUMENTS

| | | | | |
|---|---|---|---|---|
| 5,917,480 A | * | 6/1999 | Tafoya et al. ............... 715/732 |
| 6,008,807 A | * | 12/1999 | Bretschneider et al. ..... 715/732 |
| 6,598,045 B2 | * | 7/2003 | Light et al. .................... 707/5 |
| 6,717,591 B1 | * | 4/2004 | Fiveash et al. .............. 715/732 |
| 2002/0087595 A1 | * | 7/2002 | Friedman et al. ........... 707/512 |
| 2003/0005044 A1 | * | 1/2003 | Miller et al. ................. 709/203 |
| 2003/0160814 A1 | * | 8/2003 | Brown ......................... 345/732 |
| 2003/0196094 A1 | * | 10/2003 | Hillis et al. .................. 713/179 |
| 2003/0225641 A1 | * | 12/2003 | Gritzmacher et al. ......... 705/34 |
| 2004/0002049 A1 | * | 1/2004 | Beavers et al. .............. 434/350 |
| 2004/0061716 A1 | * | 4/2004 | Cheung et al. .............. 345/710 |
| 2004/0193597 A1 | * | 9/2004 | Johnson ......................... 707/6 |
| 2005/0034077 A1 | * | 2/2005 | Jaeger ......................... 715/732 |
| 2005/0074731 A1 | * | 4/2005 | Brazil ......................... 434/236 |
| 2005/0108234 A1 | * | 5/2005 | Oksanen et al. ............... 707/9 |
| 2005/0138570 A1 | * | 6/2005 | Good et al. .................. 715/789 |
| 2005/0160368 A1 | * | 7/2005 | Liu et al. ..................... 715/762 |
| 2005/0191035 A1 | * | 9/2005 | Jung et al. ..................... 386/95 |
| 2006/0015893 A1 | * | 1/2006 | Kitsukawa et al. ........... 725/23 |
| 2006/0037052 A1 | * | 2/2006 | McDowell et al. ........... 725/80 |
| 2006/0265643 A1 | * | 11/2006 | Saft et al. ................... 715/517 |

(Continued)

OTHER PUBLICATIONS

RoBling et al., Enhancing Classroom Lectures with Digital Sliding Blackboards, ACM 2004, pp. 218-222.*

(Continued)

*Primary Examiner*—Cong-Lac Huynh
(74) *Attorney, Agent, or Firm*—Amin, Turocy & Calvin, LLP

(57) ABSTRACT

The subject invention provides a unique system and method that facilitates a viewer's viewing experience of a presentation as shown on the viewer's own machine. The system and method provide the viewer with navigation and annotation control of the viewer's view of the presentation without affecting the presenter's presentation and/or the presenter's display of the presentation. When viewing a presentation, the viewer can annotate at least a portion of the presentation with text, audio, ink markings, as well as insert URL or other web-based information. Searches can be conducted during the viewing of the presentation to further supplement content in the presentation. The search results including the pertinent URLs can be added in whole or in part to the relevant portions of the presentation. Furthermore, the viewer can view the presentation in a variety of perspectives and zoom levels to gain context over the presentation or parts thereof.

16 Claims, 14 Drawing Sheets

U.S. PATENT DOCUMENTS

2007/0136743 A1* 6/2007 Hasek et al. .................. 725/33
2007/0226763 A1* 9/2007 Hempleman et al. ......... 725/46

OTHER PUBLICATIONS

Anderson et al., Speech, Ink, and Slides : The Interaction of Content Channels, ACM 2004, pp. 796-803.*
Wei et al., MediaAlert—A Broadcast Video Monitoring and Alerting System for Mobile Users, ACM Jun. 2005 (see pp. 1-2 of ACM search), pp. 25-38.*
Kelly et al., Designing for Improved Social Responsibility, User Participation and Content in On-Line Communities, ACM 2002, pp. 391-398.*
Dontcheva et al., v4v: a View for the Viewer, ACM Nov. 2005, pp. 1-8.*
L. Good, et al.; "Zoomable User Interfaces as a Medium for Slide Show Presentations", Human Computer Interaction Lab, University of Maryland, 2002, pp. 35-49.
L. Good, et al.; "CounterPoint: Creating Jazzy Interactive Presentations", Human Computer Interaction Lab, University of Maryland, 2001, 9 pages.
R. Anderson, et al.; "A Study of Digital Ink in Lecture Presentation", CHI 2004, Apr. 24-29, 2004, pp. 567-574, Vienna, Austria.

* cited by examiner

PRESENTATION VIEWING TOOL DESIGNED FOR THE VIEWER

TECHNICAL FIELD

The subject invention relates generally to presentation viewing and in particular, to various improvements to the viewing aspect of a computer-based presentation which facilitates greater interaction between the viewer and the presentation.

BACKGROUND OF THE INVENTION

Conventional systems and/or applications for computer-based presentations such as slide shows typically offer two modes: an authoring mode and a display mode. The authoring mode allows for the presentation to be created. In particular, the author can generate multiple slides for a later showing to an audience, for example. Members of the audience can view the presentation via the display mode of such system or application on their personal machine. However, the display mode on conventional systems can be rather restrictive for the viewer because this mode only permits a user to click through each slide. No other interaction is available aside from the author mode—which may not be appropriate for the viewer since the viewer may have no desire to make changes or otherwise alter the presentation. Thus, there remains a need for a system that can improve or enhance the viewing experience.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to a system and/or methodology that facilitate providing a more interactive viewing experience for the viewer of a computer-based presentation. In many instances, presentations can be viewed online (e.g., Internet or Intranet) in which a copy of the presentation is available on the viewer's local machine. The system and method of the invention provide the viewer with additional navigation and viewing options to assist the viewer (user) in gaining context over the presentation. More specifically, the user can annotate the presentation in a variety of ways. For example, when viewing a slide show, the user can type or otherwise enter notes or other markings (e.g., highlight, circle, underline, etc.) on any portion of the presentation. Tabs or flags can be shown on the affected portion of the presentation to indicate that some type of notation has been made.

Navigation and visualization of the presentation can also be improved through the employment of 3D graphics, section markers, and a user-controlled display. The 3D graphics and section markers can provide the user with a number of different perspectives of the presentation. In addition, the user-controlled display permits the user to peruse the presentation at a different pace and from a different perspective than the presenter while still maintaining an awareness of the presenter's current position in the presentation.

Another aspect of the invention allows the user to set an alert mechanism on at least a portion of the presentation (e.g., one or more pages) to notify the user when the presenter reaches that portion of the presentation. This can be particularly useful when the user has a greater interest in one specific part of the presentation and would like to have his attention drawn to the presenter when the part or parts are reached.

In yet another aspect of the invention, a browsing feature can be employed by the user (such as before, during, or after the presentation) to augment or supplement the presentation materials. The respective URL hyperlinks or copies of the pertinent web page content can be noted on the appropriate portions of the presentation.

Any annotations made to the presentation can be saved by the user in whole form whereby the presentation and any added information is stored together as made by the user. Alternatively or in addition, the added information can be condensed or summarized into a document separate from but still in reference to the presentation. For example, if a note is entered on page 2 of the presentation, the note can be saved to appear on page 2 of the presentation and/or the note can be saved to a separate document and appear in a form similar to "on page 2 of WZY (title of) presentation: (the content of the note)". Thus, when saved to a separate document, the user is provided with some context with respect to the note.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
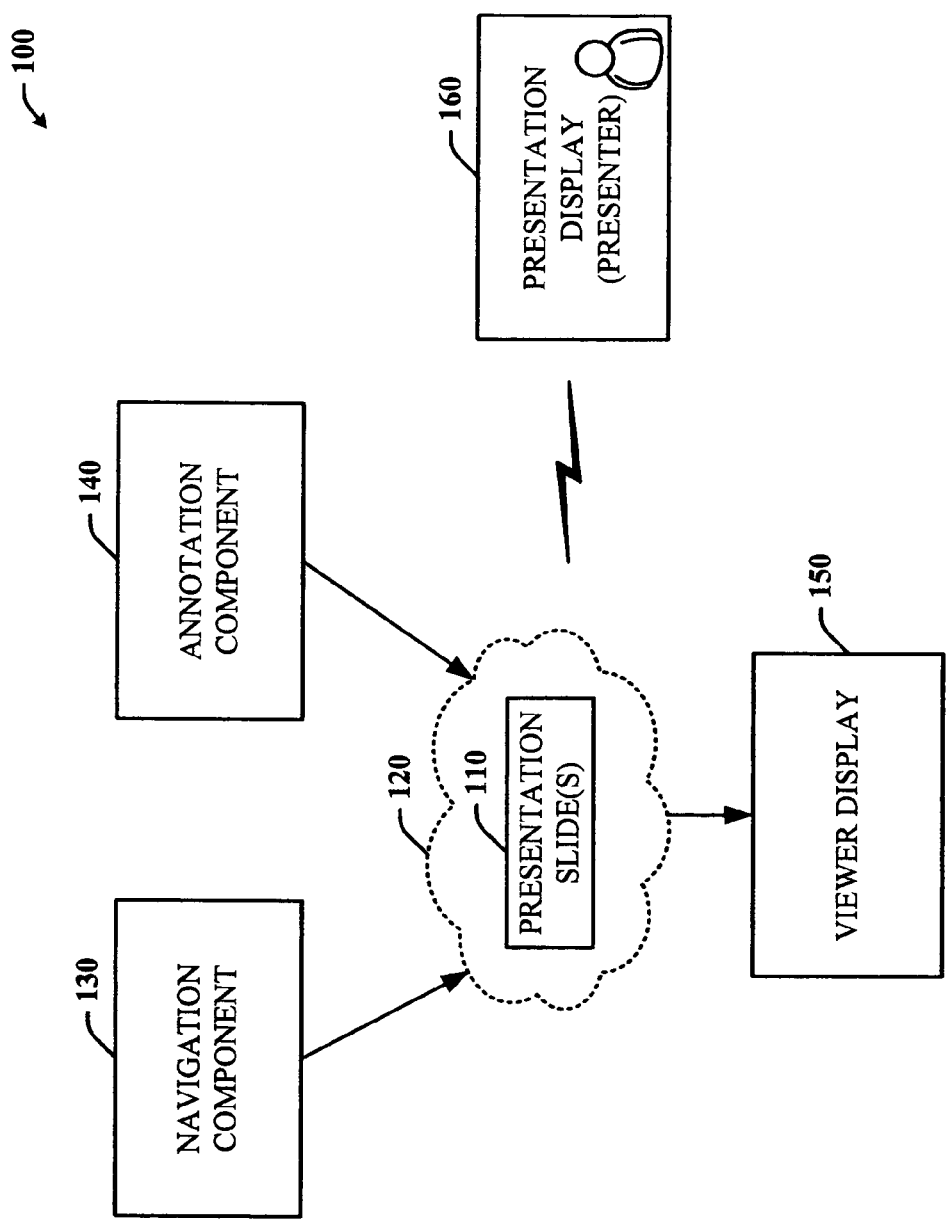
FIG. 1 is a high-level block diagram of a presentation viewing system for a viewer in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with browsing for additional or supplemental information based on key terms identified extracted from at least a portion of a computer-based presentation. In particular, inference schemes can be employed to automatically perform searches on terms or phrases indicated by the viewer. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "viewer" as used herein refers to the user or users who are looking at or watching a computer-based presentation, such as a slide show presentation, for example, given by a presenter. The subject invention provides a new interface for viewing presentations on the user's own device such as a pocket PC, laptop, tablet PC, or desktop PC. FIGS. 1-15 that follow below discuss various aspects of the invention.

Referring now to FIG. 1, there is a high-level block diagram of a presentation viewing system 100 that benefits the viewer in accordance with an aspect of the subject invention. Imagine that a viewer is viewing a presentation 110 on his/her local machine 120. While viewing the presentation 110, the viewer can employ the system 100 which includes a navigation component 130 and an annotation component 140 to gain viewing control of the presentation.

The navigation component 130 can make use of 3D graphics to provide the viewer with various perspectives on the presentation while moving between slides, for example, of the presentation. In particular, the navigation component can allow the viewer to mark or create breaks or sections throughout the presentation to facilitate highlighting particular parts or slides of the presentation. For example, in a 20 page presentation, the viewer can mark page 8. Because page 8 has been marked, subsequent pages (or slides) can be placed "behind" page 8 in a 3D manner to effectively create a stack of pages separate from pages 1-7—which may make up another stack. Additional "stacks" can be created in a similar manner throughout the presentation. With the 3D graphics, the viewer can see at least the relative number of pages which are included in each stack.

Furthermore, the navigation component 130 can provide an overview of the presentation as well as a view of the presentation at different levels of detail by zooming in and out of the presentation. Hence, the viewer can gain a better understanding of the presentation by viewing it in from various perspectives—unlike the standard page-by-page perspective.

When the viewer is viewing the presentation during a presenter's discussion of the presentation on the viewer's display 150, the viewer can move about the presentation, create section markers, etc. while still maintaining a reference to where the presenter is in the presentation. This is because the viewer's "copy of the presentation" is linked to the presenter's display 160 of the presentation. Therefore, the content of the presentation may be the same between the viewer's machine and the presenter's machine, but the viewer may not be looking at the same display of the presentation as the presenter.

As the viewer navigates through the presentation on his/her own accord, the annotation component 140 can be employed to assist the viewer in remembering points made by the presenter at a particular point in the presentation (e.g., on a certain slide or page), commenting on the presenter's opinion, taking notes, highlighting important information, and the like. In particular, the annotation component 140 provides a plurality of ways for the viewer to add his/her input onto any portion of the presentation without actually modifying the presenter's version of the presentation or the original content of the presentation. For example, the annotation component 140 can apply virtual tracing paper over a portion of the presentation so that the viewer can "write directly" on that portion without changing the content of the presentation. The virtual tracing paper can cover the desired portion and then be saved with or as a part of the presentation on the viewer's local machine 120. Additionally, it can be saved in a separate document. In practice, for instance, imagine that the contents of the tracing paper can be included in a presentation summary for the viewer. The presentation viewer can include the various text or audio input the user entered with respect to the presentation.

Moreover, there can be two different viewing modes available to the viewer: synchronous ("sync") or asynchronous. When a user is in "sync mode", the presenter controls the switching of slides on the user's display. By simply clicking on the current slide, for example, the user can switch to "asynchronous" mode and then can be presented with various features including navigation and annotation controls and a picture-in-picture of the current slide (in-set window) that the presenter is on (the presenter is still in control of the picture-in-picture). When in the asynchronous mode, the user can simply click on a respective "sync" control or the picture-in-picture (in-set window) to toggle back to the sync mode.

Figure 2:
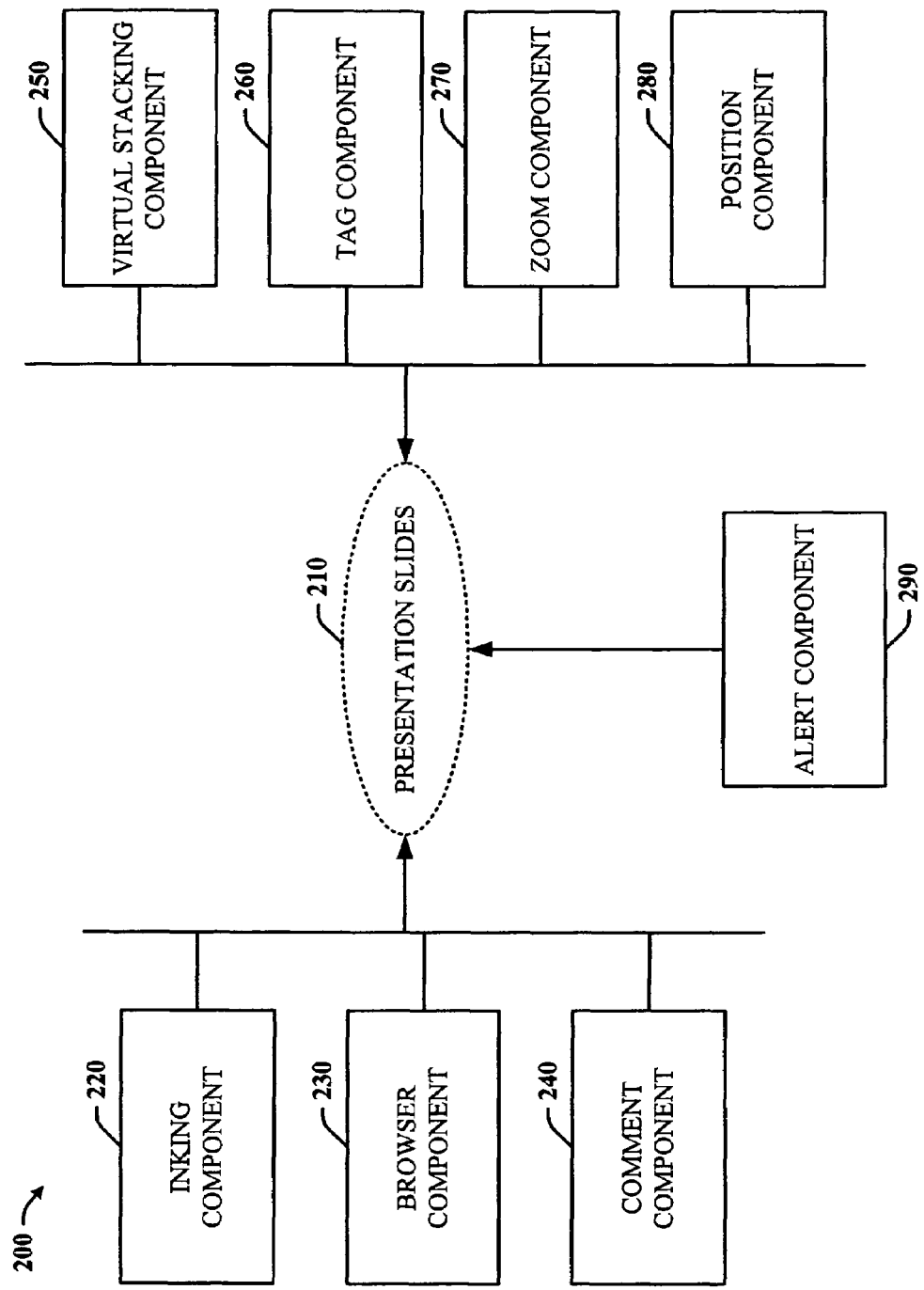
FIG. 2 is a block diagram of a presentation viewing system for a viewer in accordance with another aspect of the subject invention.

Referring now to FIG. 2, there is a block diagram of a presentation viewing system 200 that is designed for the viewer in accordance with an aspect of the subject invention. The presentation viewing system 200 includes a plurality of components that facilitate navigating and annotating a computer-based presentation 210 (e.g., presentation slides). In particular, the system 200 includes an inking component 220 that can add text or other pen-related markings to one or more desired parts of the presentation. For example, the user can write in his/her thoughts with respect to a slide on a portion of the particular slide, on a virtual note pad associated with the slide, and/or on a tab or flag on the side of the slide. Ink-type markings can be made by different pointing devices such as a stylus or mouse. For instance, the viewer can use a stylus or a mouse to circle an important sentence or phrase on a slide.

Annotation of the presentation 210 can also be performed using a browser component 230 and/or a comment component 240. The browser component 230 can conduct internet or intranet searches to look for information to supplement or support any materials in the presentation as desired by the user. When the user has found the relevant information, the user can copy the information from the web site, for example, or can simply make note of the URL where the information was found.

The comment component 240 can add typed text or audio recordings to any desired slide or portion of the presentation 210. The text or audio recording can be indicated in a tab or other flag-type marker on the relevant slide, for example. Thus, when viewing a plurality of slides, the user can easily identify to which slides comments have been added. This can also be true for search information, URL information, and ink markings which have been added to the slides. A tab component 260 can make any type of annotation which has been made to various portions of the presentation visible to the viewer—particularly when the slides are assembled into multiple stacks via a virtual stacking component 250. The tab component 260 can change or otherwise modify the appearance of any type of tab (e.g., comment tab, browser tab, etc.) to convey that there is information in a particular tab or to convey the type of information in the tab. For example, the color difference makes it possible for the viewer to see which slides have or do not have annotations from a high level (zoomed out) view.

The virtual stacking component 250 can mark slides based on their relative importance to the viewer. For instance, when the viewer believes that slides 3, 14, and 18 are important, the viewer can invoke the virtual stacking component by marking the particular slide. Once a slide is marked in this manner, the virtual stacking component 250 can be configured to place subsequent slides behind the marked slide. Hence, the viewer can maintain a constant view of the marked slides.

To obtain an overall view of the presentation, particularly when multiple stacks have been formed, the viewer can employ a zoom component 270 to see the overall view or to see a more detailed view of one slide or a plurality of slides. Therefore, the viewer can maintain a view of the presenter's current slide as well as slides that came before and that are coming up. Due to the 3D nature of the display, the viewer can also recognize at least an approximate number of slides remaining and perhaps compare that to the number and/or content of slides that have already been discussed.

Though the viewer has the ability to move ahead or stay on pace with the presenter or even refer to a previous slide, the viewer may still like to know the presenter's (slide) position in the presentation. For instance, the viewer may wish to follow along with the presenter after marking important slides or making comments on previous or upcoming slides. This can be accomplished at least in part by a position component 280. The position component 280 can track and place a frame around the presenter's current slide that can remain visible regardless of the viewer's view. Thus, when the user is zoomed out to see more of the presentation slides on his/her display, the presenter's current slide can be identified by the frame around it. It should be appreciated that other signs or indicators can be used in place of the frame such as an icon, symbol, or other color code to carry out this aspect of the invention.

Finally, the system 200 can also include an alert component 290. When set by the viewer on a particular slide, for example, the alert component 290 can notify the viewer when the presenter has reached that particular slide. Hence, the alert component 290 behaves effectively like an alarm to draw the viewer's attention back to the desired slide when the presenter advances to such slide. The alert component 290 can be set for as many slides or portions of the presentation according to viewer preferences.

Figure 3:
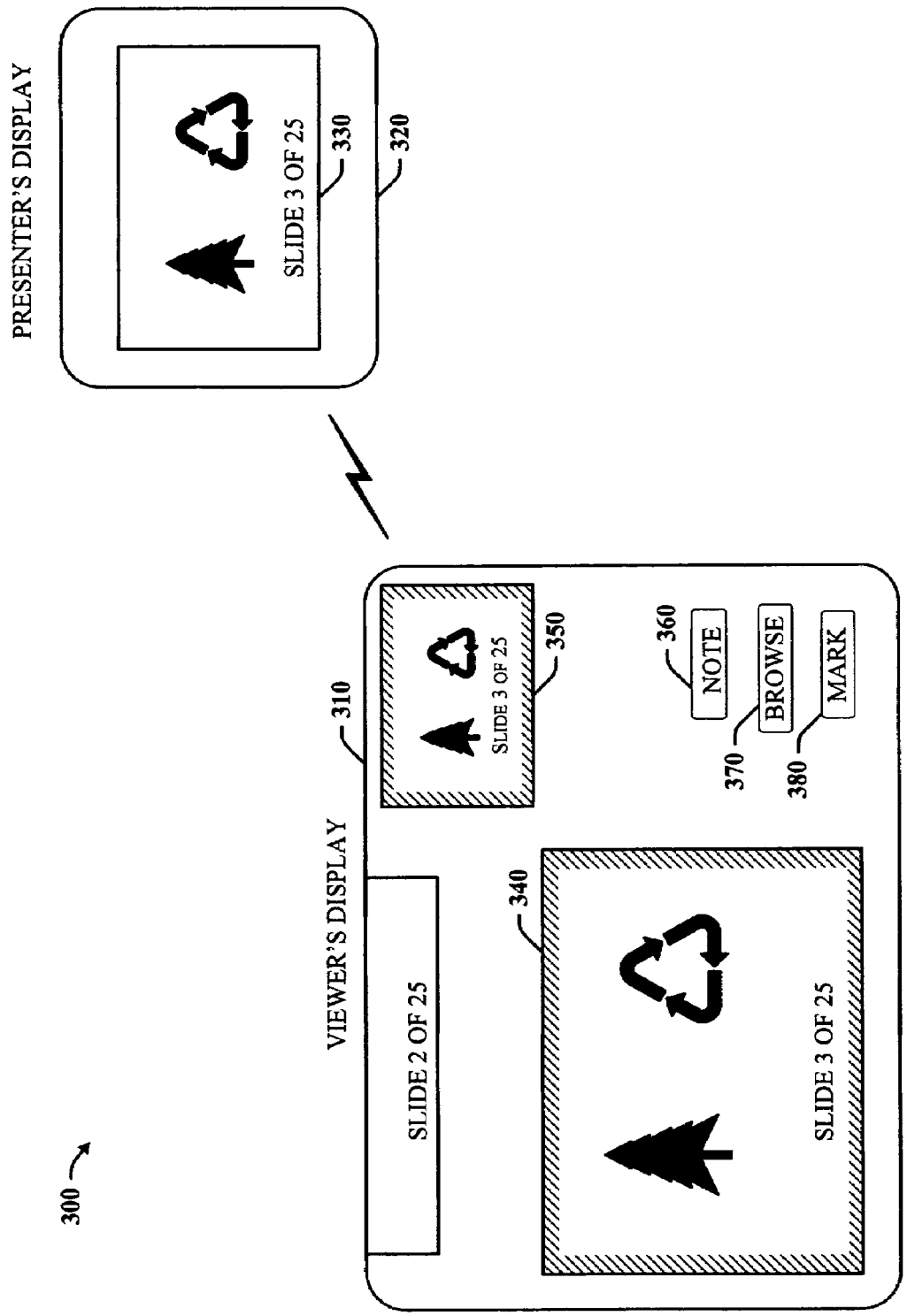
FIG. 3 is a schematic diagram that illustrates an exemplary user interface for a presentation viewing system for a viewer in accordance with an aspect of the subject invention.
Figure 4:
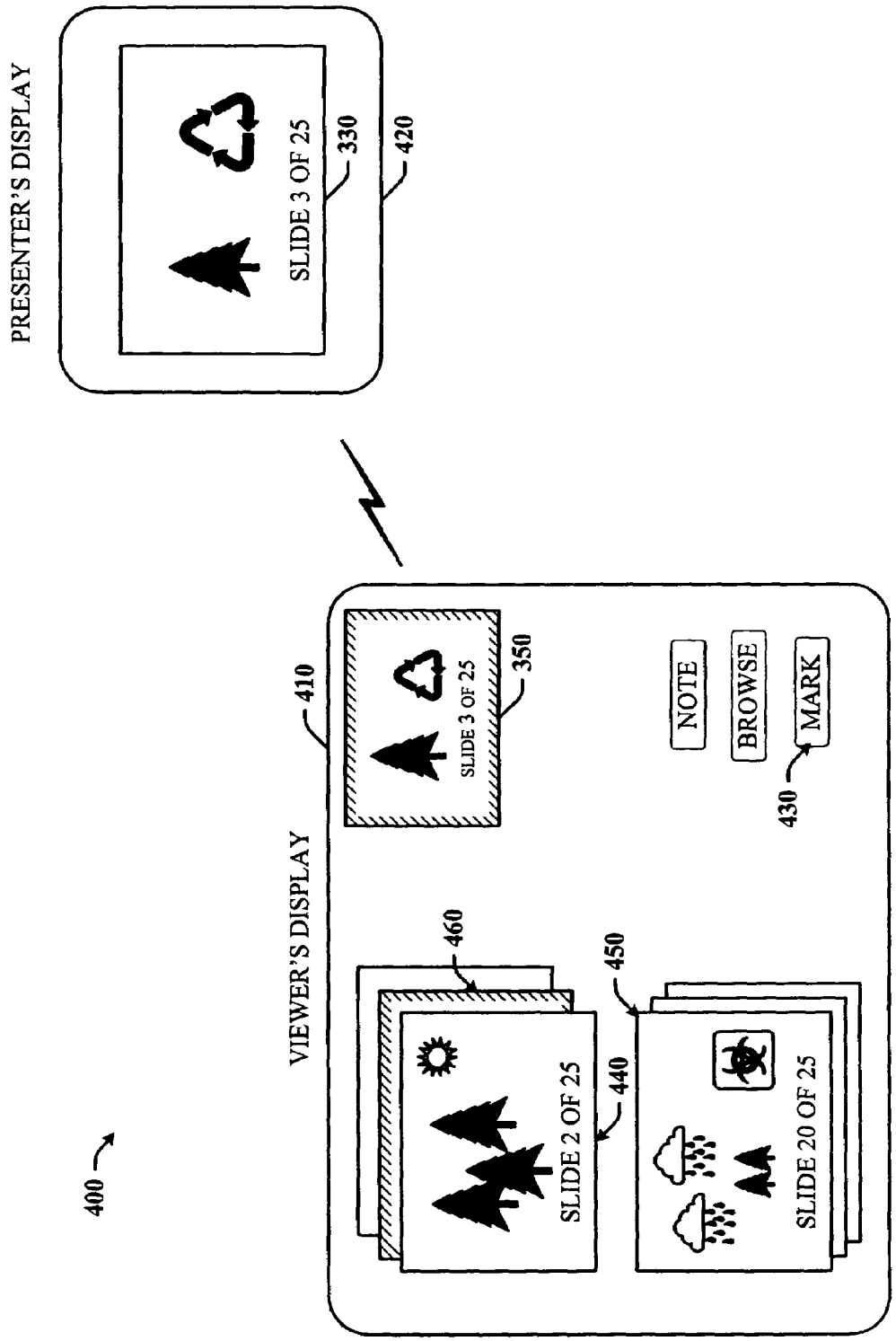
FIG. 4 is a schematic diagram that illustrates an exemplary user interface for a presentation viewing system for a viewer in accordance with an aspect of the subject invention.
Figure 5:
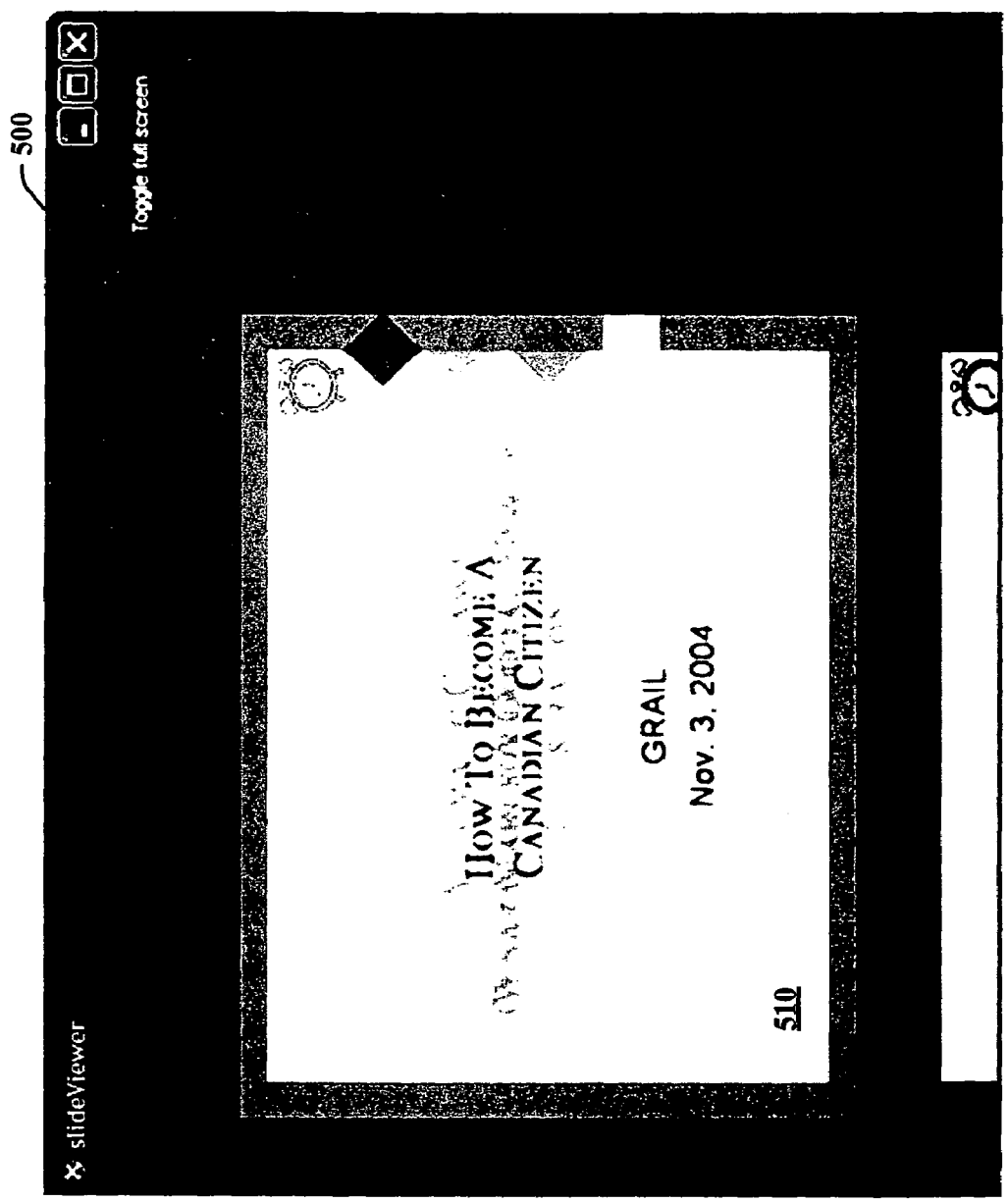
FIG. 5 is a screen capture of an exemplary user interface for a presentation viewing system for a viewer in accordance with an aspect of the subject invention.

Turning now to FIGS. 3 and 4, schematic representations (300 and 400, respectively) of a viewer's display with respect to a presenter's display are shown. In FIG. 3, the viewer's display 310 can be linked and synchronized with the presenter's display 320 such that the viewer can watch the presentation 330 from his/her own device and advance through the presentation independent of the presenter. When the viewer is linked (or synchronized) with the presenter, the viewer's display can look different from what is shown in the figure. For instance, in practice there may not be an in-set window showing the presenter's slide. As can be seen in the figure, the presenter appears to be on slide 3 of 25. The viewer appears to be on the same slide as the presenter. This may have been accomplished manually or by invoking an auto-view mode. That is, the viewer may be manually advancing through the presentation at the pace of the presenter; or the viewer may have set his/her viewer on auto-view to allow the viewer's view to coincide automatically with the presenter's display.

In some cases, the viewer may be viewing the presentation from a remote location (e.g., not in direct sight of the presenter). Thus, in order for the viewer to know the presenter's current place in the presentation, the current slide, for example, can be color coded (340) or otherwise identified with some other symbol to readily be aware of the presenter's position within the presentation.

Alternatively or in addition, the viewer's display 310 can include an inset 350 of the presentation as given by the presenter. Thus, the viewer can continue to "see" the presentation at the presenter's pace when the viewer is perusing through other parts of the presentation. The presenter's current slide in the inset 350 can be color coded (340) as well to match with the viewer's display of the presentation.

Other controls such as NOTE 360, BROWSE 370, and MARK 380 can be employed by the viewer to make notes or comments with respect to any slide, to browse the Internet for related information, and/or to mark that any particular slide is important to the viewer, respectively. Each slide or page of the presentation can have individual buttons, or controls visible to the viewer or the display in general can include the controls. In either instance, any slide that includes additional information as entered by the viewer (e.g., note or Internet content) can be identified according to the type of additional information. For example, a slide with annotated notes can be indicated with a yellow flag appended thereto; whereas a slide with annotated URL or Internet information can be indicated with a flag in a different color. Likewise, some tabs or flags can be employed which are content-specific and only such types of content can be entered. For example, a red tab can only accept URL or other hyperlinks. It should be appreciated that other types of indicators can be utilized to identify an annotated slide as well as the type of annotated content.

In FIG. 4, the schematic representation 400 illustrates another aspect of the viewer's view of the presentation in accordance with the subject invention. The viewer's display 410 remains synchronized to the presenter's display 420 as discussed in FIG. 3, supra. However, the viewer has decided to navigate through the presentation independently of the presenter and identify various slides as being more important. This can be performed in part by "marking" the desired slides of the presentation via a mark control 430. For example, when slide 2 is selected or being actively viewed, the viewer can click on the mark control 430. As the viewer continues to scroll or page ahead in the presentation, the subsequent slides can be placed behind the marked slide (440, 450), thereby resulting in two stacks. The presentation remains in its original order; however, it has merely been divided up to provide a different perspective for the viewer. For easier viewing of the resulting stacks of slides, the viewer can zoom out to see both stacks.

The inset 350 still shows that the presenter is on slide 3 of 25. The corresponding slide in the viewer's display 410 can be easily recognized since the stacks are arranged in a 3D manner and the presenter's current slide remains highlighted in the viewer's stack (460).

Turning now to FIGS. 5-11, there are demonstrated exemplary user interfaces for the presentation viewing system as discussed hereinabove. Beginning with FIG. 5, the user interface 500 shows the viewer's view of the presentation 510 in a standard page-by-page view. Various display controls can be included on the user interface 500 as well to alter the overall size of the content shown within the general display (e.g., toggle between current view and full screen view 520).

Figure 6:
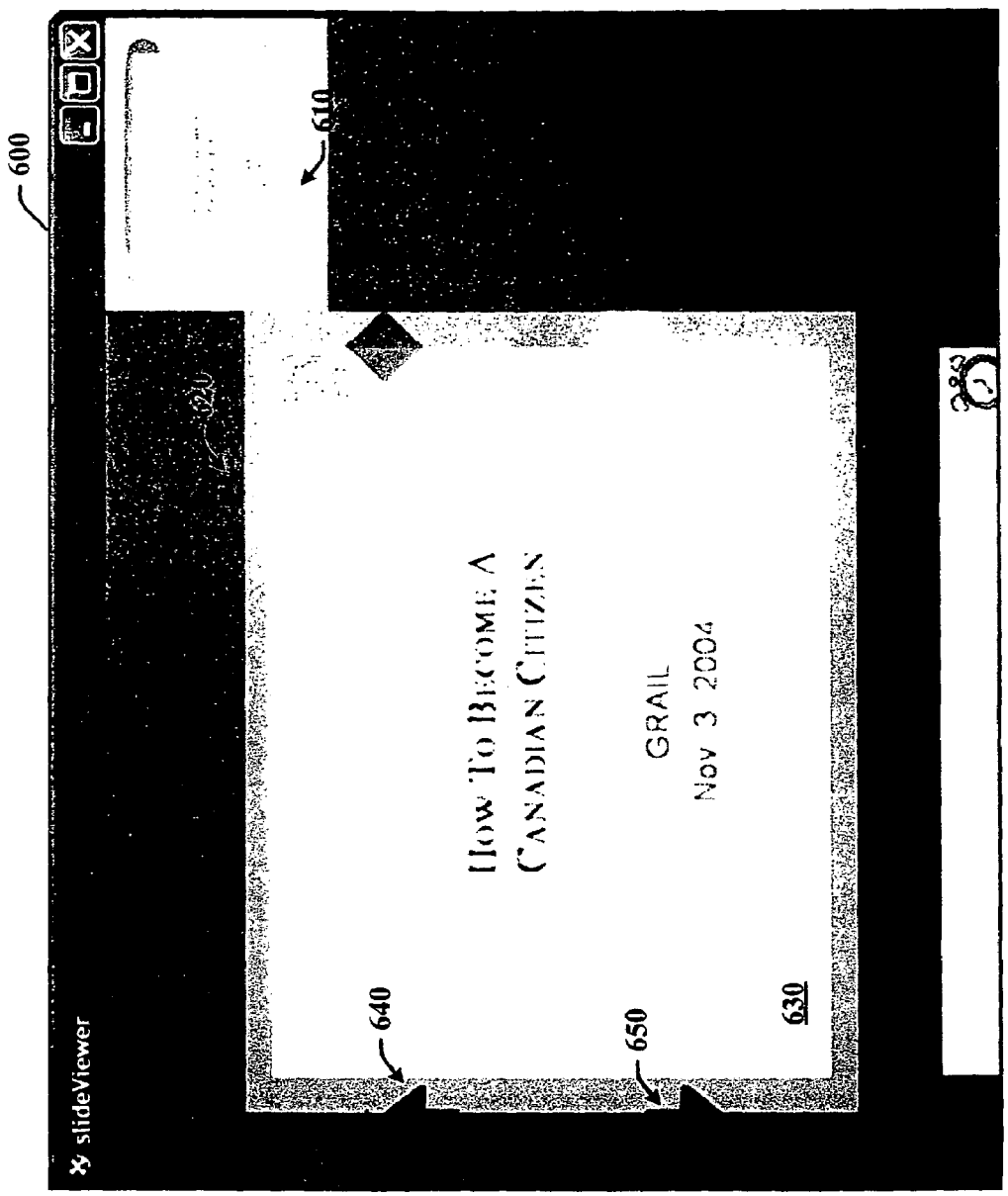
FIG. 6 is a screen capture of an exemplary user interface for a presentation viewing system for a viewer in which an active presentation is displayed in accordance with an aspect of the subject invention.

The orange frame 530 around this first slide of the presentation indicates the presenter's current slide. To actually see a view of the presenter's display on the viewer's screen (500), a click on the presentation can cause an inset view 610 of the presenter's current slide to become visible on the viewer's screen (600). FIG. 6 depicts this aspect. As can be seen the orange frame is consistent from the viewer's view 620 of the presentation 630 and the view (610) of the presenter's view. It should be understood that the orange frame may not necessarily be visible on the presenter's display (not shown). Navigation controls such as back 640 and forward 650 arrows can be positioned accordingly on the screen to assist the viewer in advancing ahead or reviewing previously viewed slides.

Figure 7:
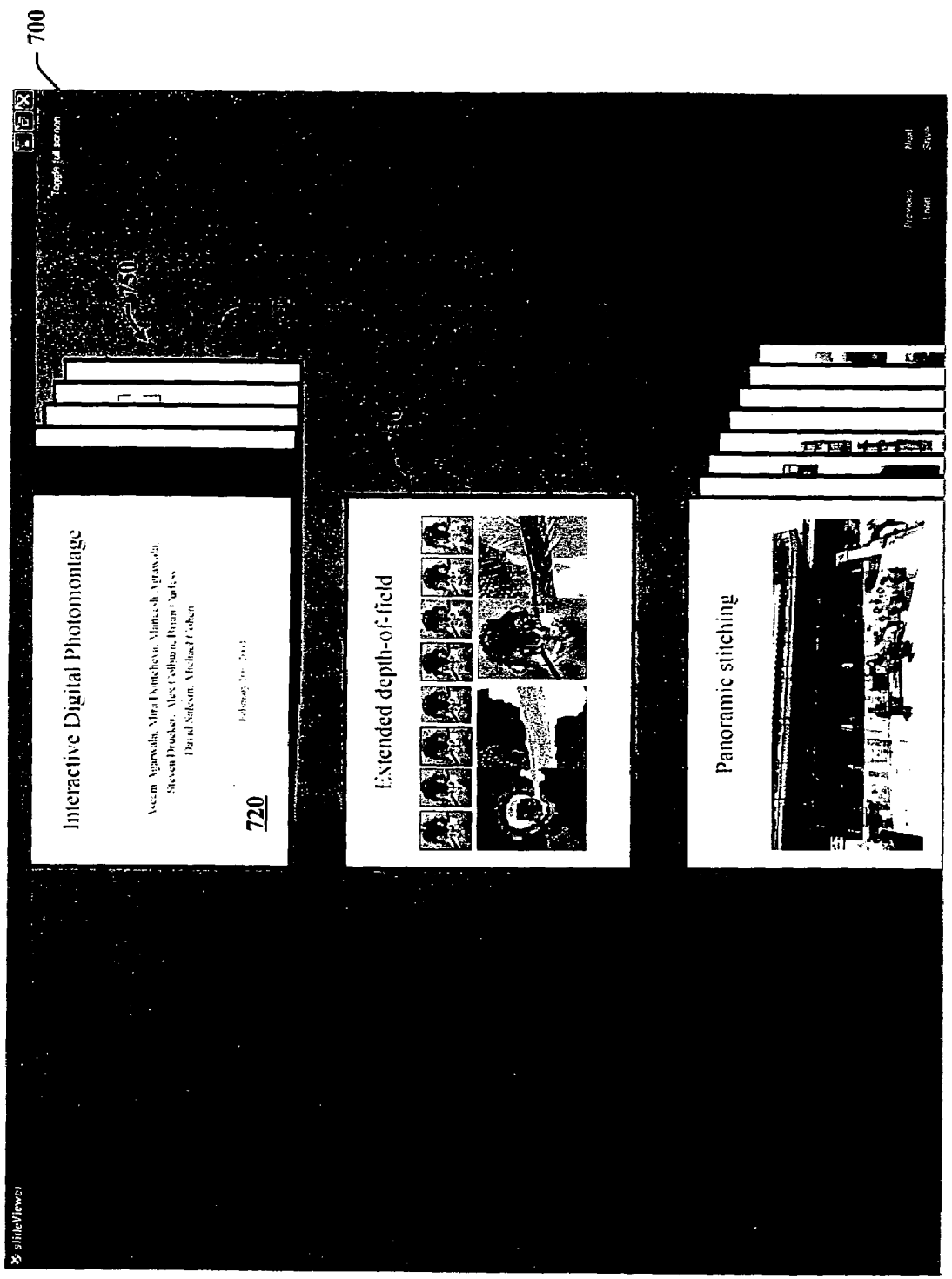
FIG. 7 is a screen capture of an exemplary user interface for a presentation viewing system for a viewer that demonstrates a zooming feature in accordance with an aspect of the subject invention.

In FIG. 7, the user interface 700 indicates that the viewer has invoked a zoom control to view an overview 710 of the presentation 720. The active portion 730 of the display can be indicated by the placement of the navigation arrows 740. Thus, when clicking on the down or forward arrow, the slide entitled "Extended depth-of-field" can be placed behind any previous slides 750 and the next slide entitled "Panoramic stitching" can be placed in the active portion 730 of the display. When zooming in to see more detail, the active portion can be enlarged by default. However, it can be possible to zoom in to other parts of the presentation 720. The slides 760 located below the active portion 730 of the display may or may not have been viewed by the viewer. In either case, the viewer can see a glimpse of them due to the zooming capabilities.

Figure 8:
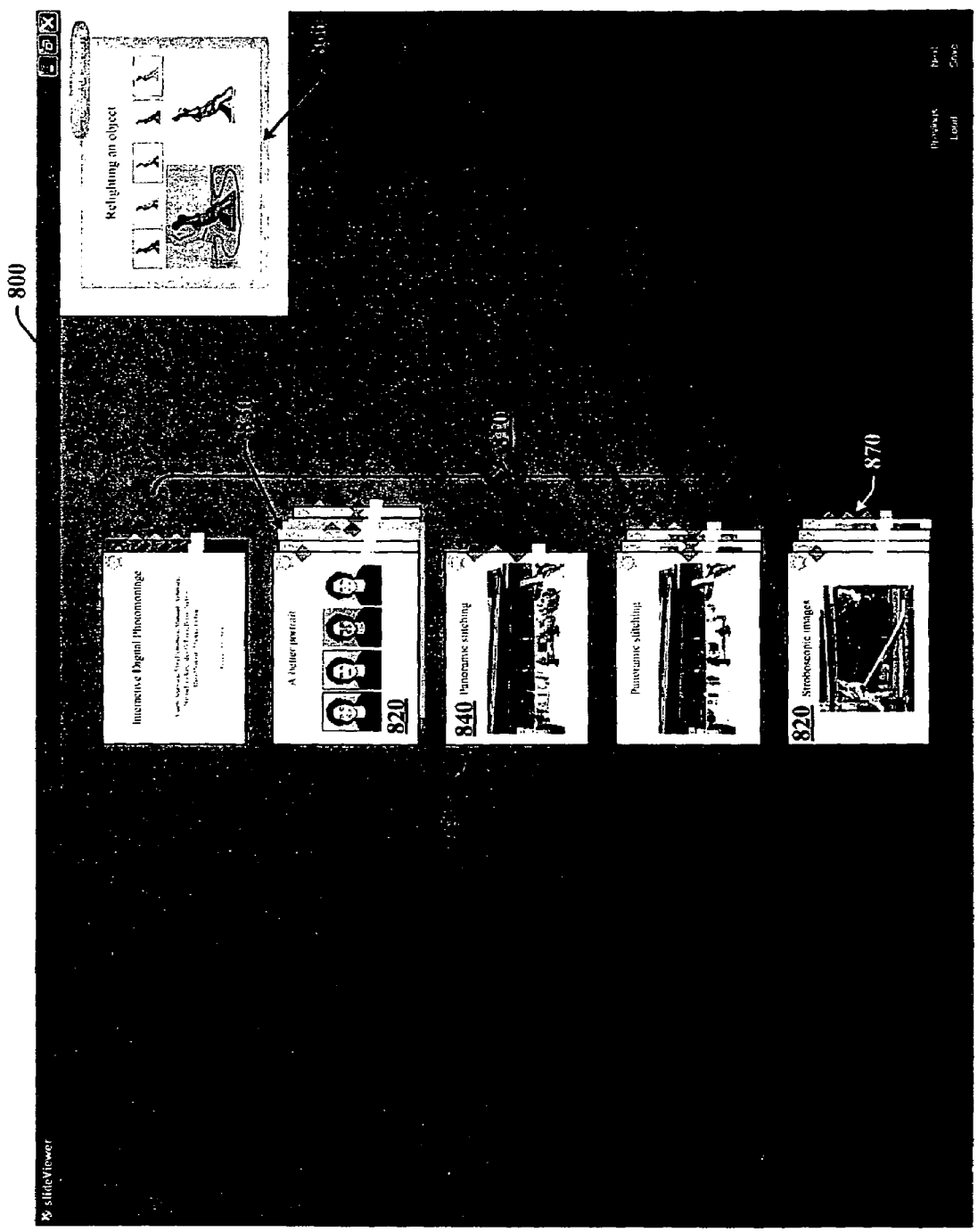
FIG. 8 is a screen capture of an exemplary user interface for a presentation viewing system for a viewer that demonstrates a plurality of features in accordance with an aspect of the subject invention.

Moving on to FIG. 8, the user interface 800 has displayed thereon a zoomed out view of a plurality of stacks 810 created by the user. In particular, the viewer can readily see any slides 820 that have been marked as important. Such slides 820 can be situated at the top of the relevant stack for quick reference and viewing. In this figure, it is apparent that the viewer has moved ahead of the presenter as is evidenced by the location of the orange framed slide 830 compared to the slide 840 currently in view in the active portion 850 of the screen (800). Aside from locating the orange framed slide, the viewer could also compare the presenter's current slide as shown in the inset view 860 of the presenter's display with the slide 840 in the active portion 850 of the screen to quickly determine whether the viewer is on the same slide as the presenter.

Figure 9:
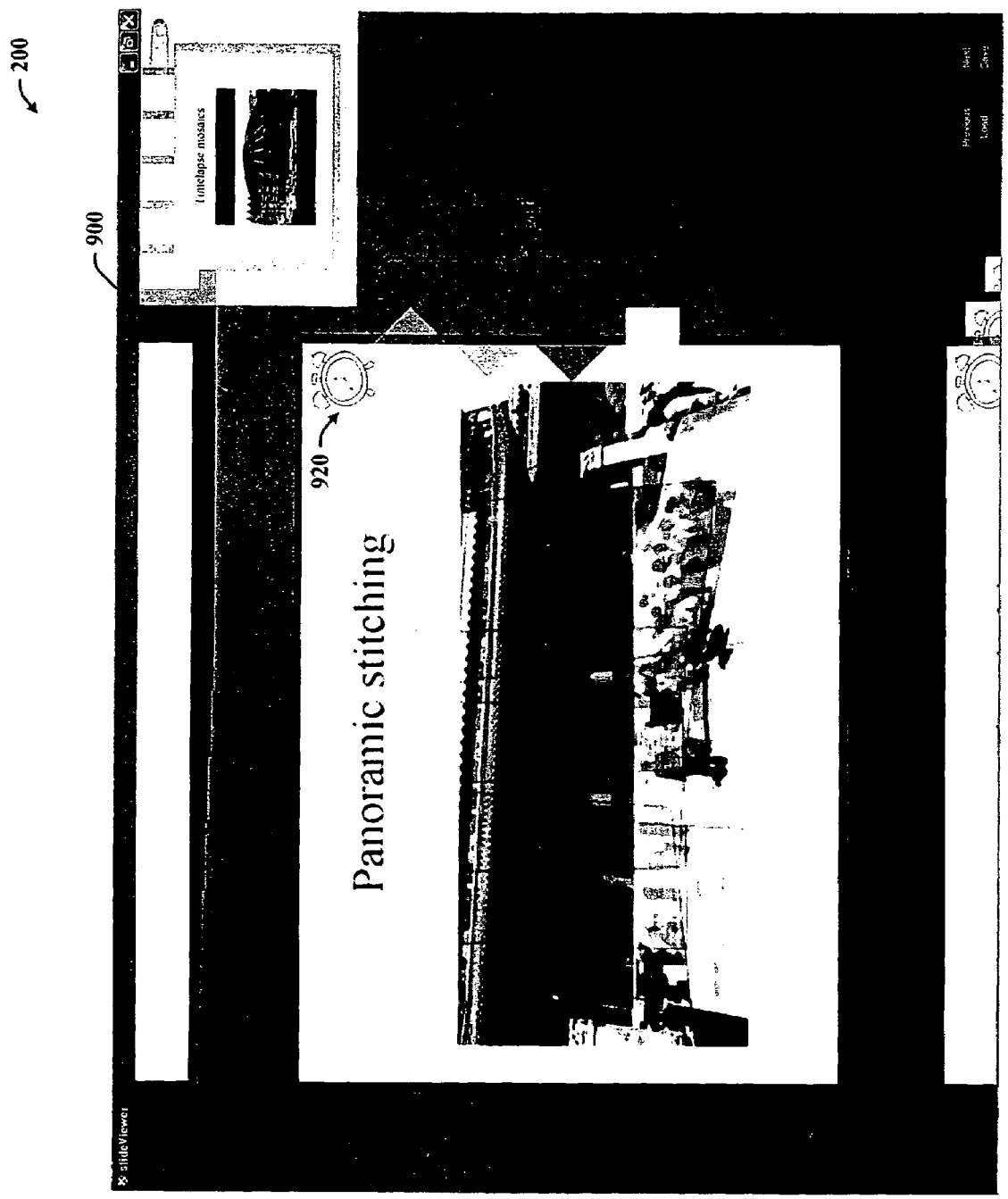
FIG. 9 is a screen capture of an exemplary user interface for a presentation viewing system for a viewer that demonstrates navigation and annotation features in accordance with an aspect of the subject invention.

Unlike the user interface 700 in FIG. 7, the user interface 800 in FIG. 8 demonstrates that the individual slides of the presentation can each have a plurality of tabs. Each tab, for example can represent different types of content that have been annotated to the slide. The user interface 900 represented in FIG. 9 illustrates the different tabs 910 in greater detail. The tabs 910 can be color coded or offered in a variety of shapes and sizes to perhaps distinguish the type of content included therein. In addition, each slide can be shown with an alarm icon which can be set to alert the viewer when the presenter has reached that particular slide. As with the tabs, the alarm icon can always appear on each slide, however, when activated or put into use, the color, shade, or appearance of the icon may change in a noticeable manner.

Figure 10:
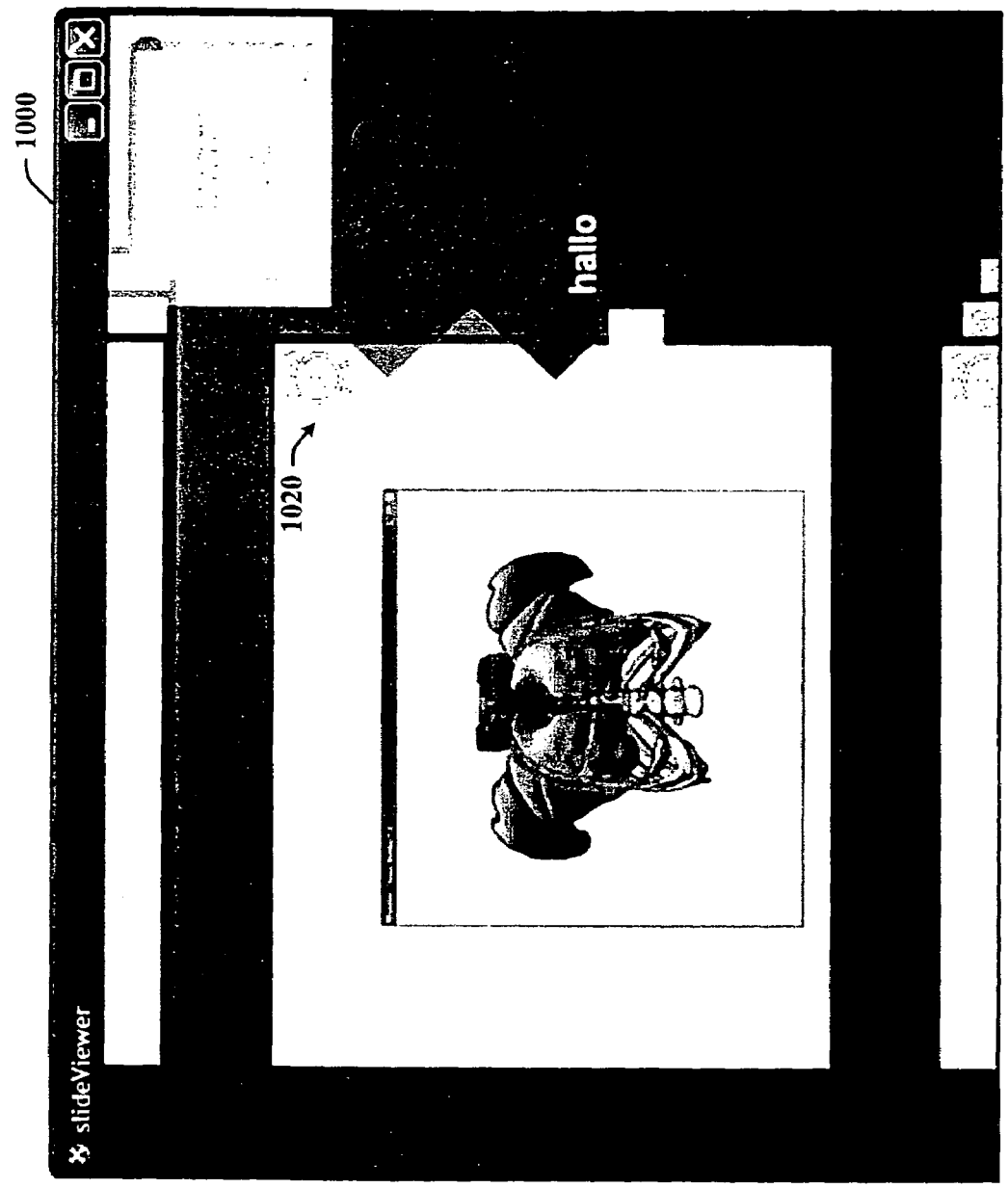
FIG. 10 is a screen capture of an exemplary user interface for a presentation viewing system for a viewer that demonstrates an annotation feature in accordance with an aspect of the subject invention.

The user interface 1000 shown in FIG. 10 demonstrates a unique feature of the tabs 1010 which can also apply to the alarm icon 1020. To optimize screen space, any content entered on one or more tabs can be minimized. However, to view the content 1030 without actually opening the tab, the viewer can hover over the appropriate tab with any pointing device, as depicted in the figure.

Figure 11:
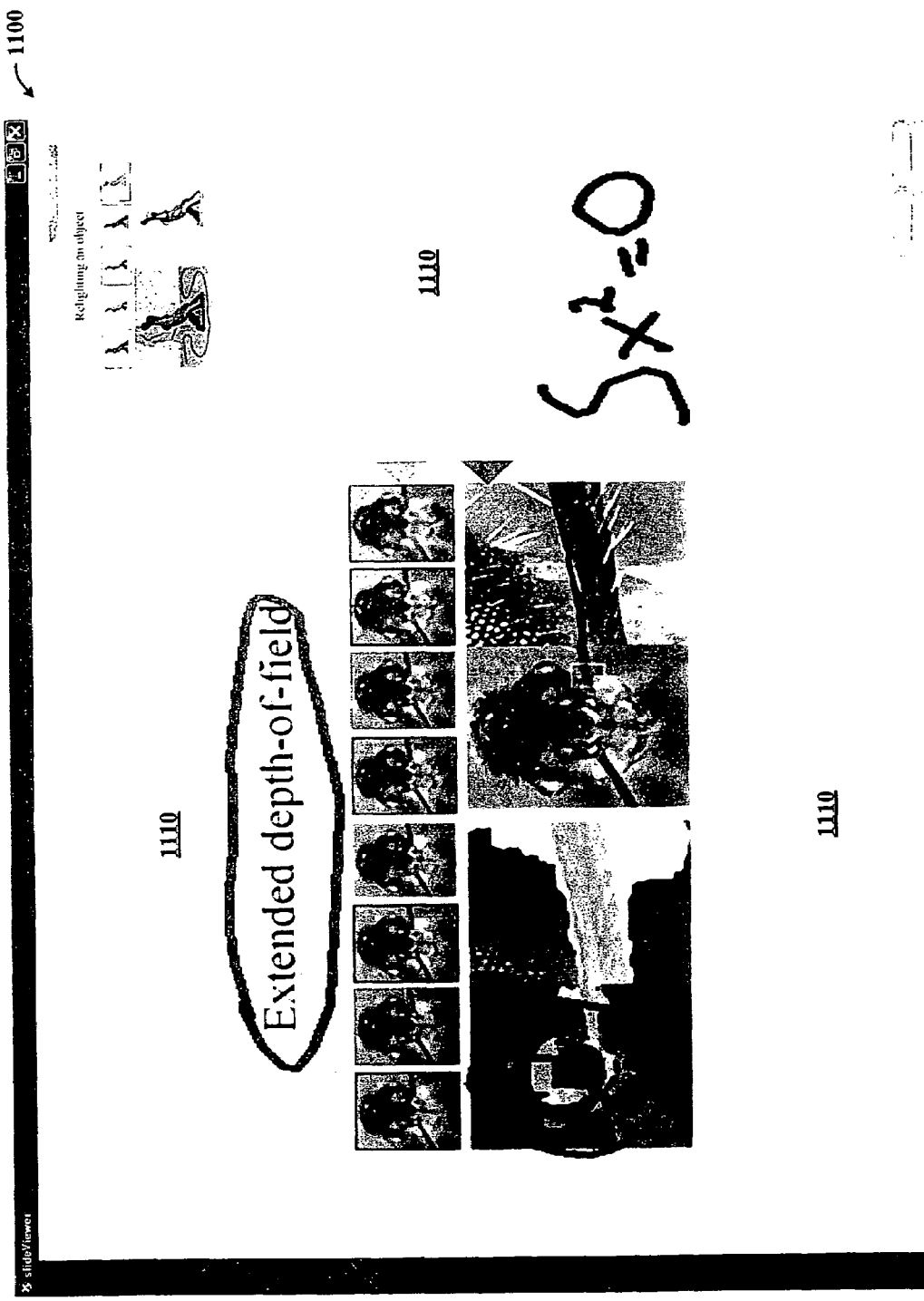
FIG. 11 is a screen capture of an exemplary user interface for a presentation viewing system for a viewer that demonstrates an annotation feature in accordance with an aspect of the subject invention.

Turning now to FIG. 11, the user interface 1100 illustrates an additional annotation feature that can be invoked by the viewer. When put into use, the annotation feature applies a piece of virtual tracing paper 1110 over the screen space. The viewer can effectively make notes, draw lines or circles, etc.

on the slide without modifying the original content of the slide. When the viewer has finished entering or writing on the tracing paper 1110 (at least for the time being), it can be minimized; and the content therein can be seen by hovering over the (tracing paper) flag or tab. The viewer can save any annotations or importance markers so that they appear relative to the appropriate slides as well as in summary form.

Various methodologies in accordance with the subject invention will now be described via a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figures 12, 13:
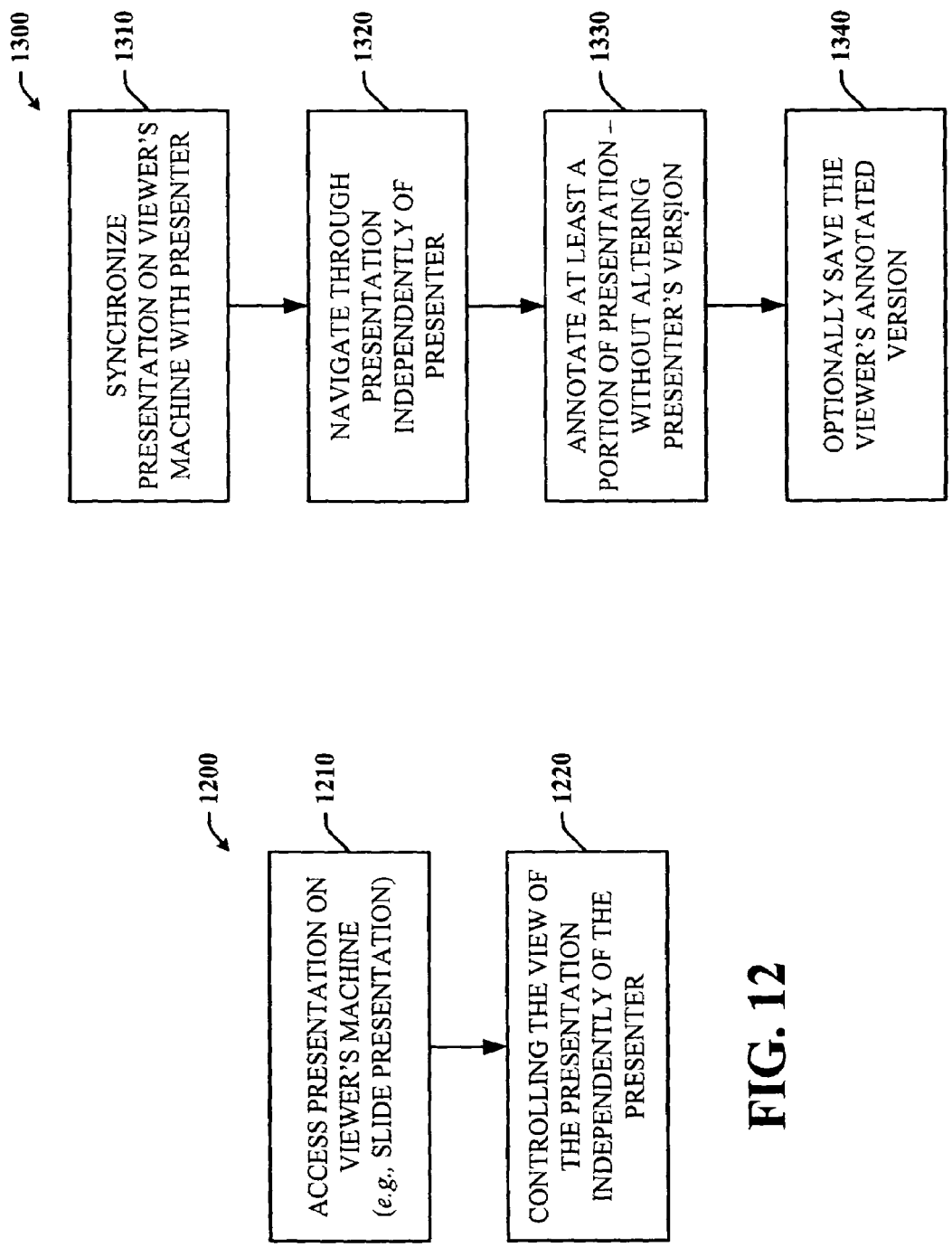
FIG. 12 is a flow chart illustrating an exemplary methodology that facilitates an improved presentation viewing experience for the viewer in accordance with an aspect of the subject invention.
FIG. 13 is a flow chart illustrating an exemplary methodology that facilitates an improved presentation viewing experience for the viewer in accordance with an aspect of the subject invention.

Referring now to FIG. 12, there is a flow diagram of an exemplary method 1200 that facilitates an improved presentation viewing experience for the viewer in accordance with an aspect of the subject invention. The method 1200 involves accessing a presentation (such as from an Internet or Intranet source) for display on the viewer's local machine at 1210. At 1220, the presentation can be viewed and controlled independently of the presenter. For example, if the viewer is disinterested in the presenter's current slide, the viewer can look ahead to other slides or look back to previous slides—while still maintaining an awareness to the presenter's current slide. This can be accomplished in part by including a view of the presenter's display on the viewer's display. In addition, color, symbols, or the like can be employed on the viewer's display to follow the presenter's current slide.

The viewer can also zoom in or out of the presentation to see an overview of the presentation as well as more detailed views of the presentation. Furthermore, various slides or portions of the presentation can be marked as important and remain "on top" or in view to the viewer. Subsequent slides can be placed behind such important slides, thus potentially forming multiple stacks of slides. The order of the presentation remains intact; however, the viewer can make his/her own subsets of slides to perhaps coincide with the viewer's needs.

Turning to FIG. 13, there is illustrated a flow diagram of an exemplary process 1300 that facilitates providing a viewer of a presentation with a number of different controls to enhance the viewing experience. The process 1300 involves synchronizing the presentation on the viewer's device with the presenter's display at 1310. At 1320, the viewer can navigate through the presentation autonomously from the presenter. Thus, the presenter's pace or actions with respect to the presentation may not necessarily affect the viewer's view of or control over the presentation. Navigation can include viewing the presentation in 3D to gain a different perspective, zooming in and out of the presentation or parts thereof, marking sections of the presentation that are important to the viewer, and viewing more of the presentation at any given time to understand the context of a particular portion.

At 1330, at least a portion of the presentation can be annotated as desired by the viewer without altering or affecting the presenter's version or the presenter's display. Different types of annotation can include text, audio, web-based (e.g., URLs and other information garnered from the Internet) materials, and the like. Such annotations can be entered in designated windows or boxes for each slide or on virtual tracing paper applied over any one slide. At 1340, the viewer can optionally save the annotations.

Figure 14:
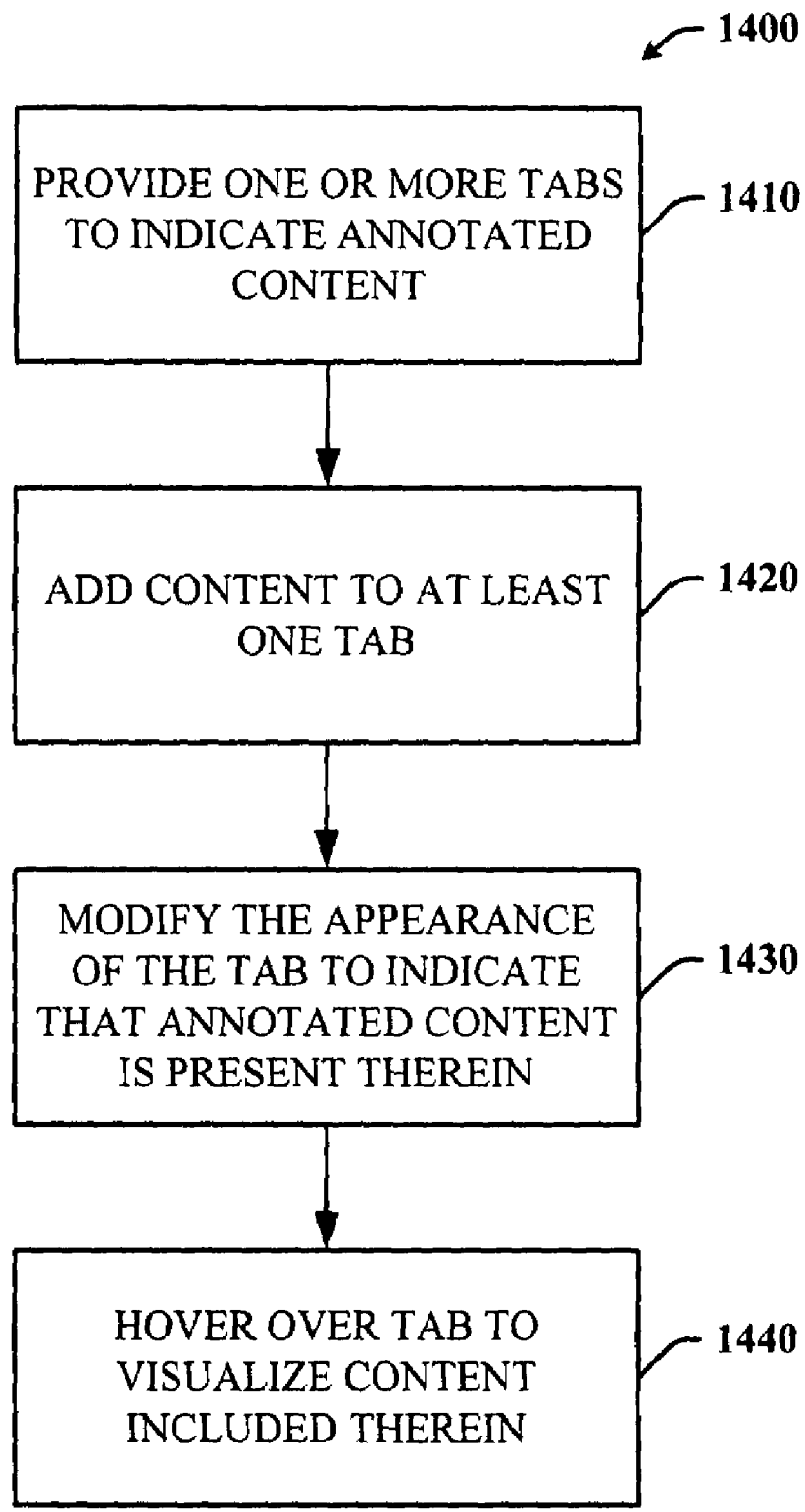
FIG. 14 is a flow chart illustrating an exemplary methodology that facilitates annotating a presentation at the discretion of the viewer in accordance with an aspect of the subject invention.

FIG. 14 demonstrates an exemplary method 1400 that facilitates indicating to a viewer that content has been annotated to a slide or some portion of a presentation. The method 1400 involves providing one or more tabs on the relevant slides to be annotated at 1410. At 1420, content can be added to the at least one tab—such as by clicking on the tab to open it. Different color or shaped tabs can be employed for different types of content. At 1430, the appearance of the tab can be modified to indicate to the viewer that content has been added to the tab. To view the content in a quick manner, the viewer can hover over the tab to visualize any content included therein.

Figure 15:
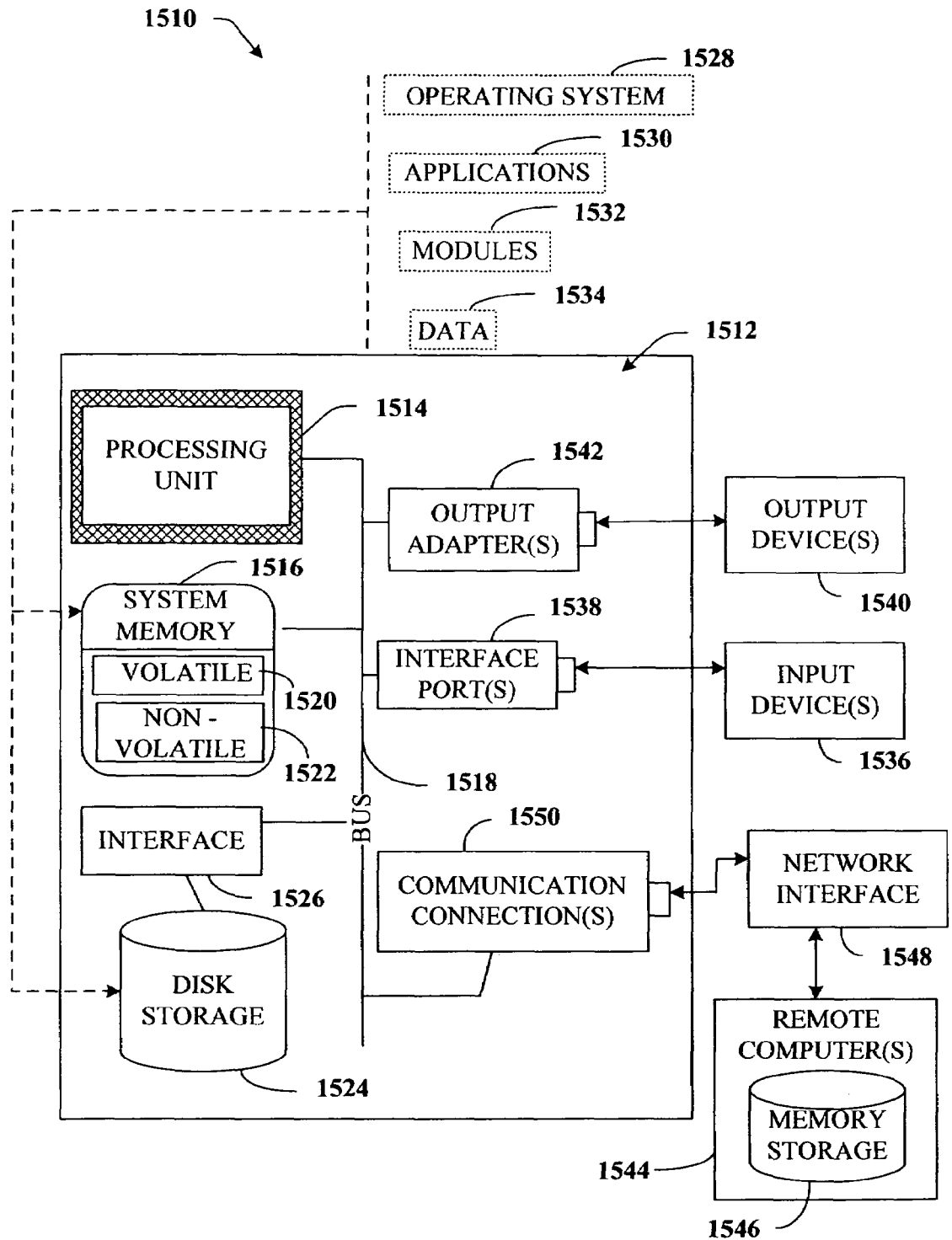
FIG. 15 illustrates an exemplary environment for implementing various aspects of the invention.

In order to provide additional context for various aspects of the subject invention, FIG. 15 and the following discussion are intended to provide a brief, general description of a suitable operating environment 1510 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1510 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 15, an exemplary environment 1510 for implementing various aspects of the invention includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable ROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/nonremovable, volatile/nonvolatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the subject invention can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512 and to output information from computer 1512 to an output device 1540. Output adapter 1542 is provided to illustrate that there are some output devices 1540 like monitors, speakers, and printers among other output devices 1540 that require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A presentation viewing system that facilitates viewing a presentation from the viewer's perspective comprising:
   a navigation component that navigates through the presentation as shown on the viewer's machine at least in part by viewer control;
   an annotation component that annotates at least a portion of the presentation with information without affecting a presenter's version of the presentation; and
   an alert component that allows the viewer to set an alert mechanism on at least a portion of the presentation to notify the viewer when the presenter reaches the portion of the presentation.

2. The system of claim 1, the navigation component comprises at least one of the following: a zoom component, a virtual stacking component, a tag component, and a position component.

3. The system of claim 2, the zoom component modifies a view of the presentation to a plurality of zoom levels to see at least one of more or less detail of the presentation.

4. The system of claim 2, the virtual stacking component forms at least one stack of at least a portion of the presentation when at least one of a page or a slide is marked as important by the viewer.

5. The system of claim 2, the tag component indicates to the viewer that an area is available to add information to at least a portion of the presentation.

6. The system of claim 2, the position component tracks the presenter's current slide on the presentation viewed on the viewer's machine.

7. The system of claim 1, the annotation component comprises an inking component and a browser component.

8. The system of claim 7, the browser component conducts one or more searches to provide additional information to the viewer regarding at least a portion of the presentation, whereby at least a portion of the desired information can be annotated to the relevant portion of the presentation; and the inking component allows text and other ink related markings to be annotated to at least a portion of the presentation according to viewer preferences.

9. A method that facilitates an enhanced presentation viewing experience for the viewer comprising:
opening a presenter's presentation on to a viewer's machine;
controlling a view of the presentation independently of the presenter without affecting the presenter's display of the presentation;
setting an alarm on at least a portion of the presentation to alert the viewer to turn to the portion of the presentation when the presenter reaches the portion; and
alerting the viewer when the presenter reaches the portion.

10. The method of claim 9 further comprising employing a synchronization component that switches control of the presentation between the viewer and the presenter based at least in part on the viewer's input.

11. The method of claim 10, annotating at least a portion of the presentation with viewer-added information comprises inking any one of notes and markings on at least a portion of the presentation.

12. The method of claim 10, navigating comprises at least one of the following: advancing through the presentation ahead of the presenter; reviewing at least one previously discussed portion of the presentation out of place with the presenter; zooming at least a portion of the presentation to view a plurality of different perspectives of the presentation to facilitate gaining context over the presentation; and breaking the presentation into one or more stacks without altering an order of the presentation.

13. The method of claim 10, further comprising saving the viewer-added information with the viewer's version of the presentation.

14. The method of claim 10, further comprising saving the viewer-added information in summary form separate from the presentation.

15. The method of claim 9, controlling the view of the presentation comprises at least one of the following: annotating at least a portion of the presentation with viewer-added information; and navigating through the presentation at the viewer's discretion on the viewer's machine.

16. The method of claim 9, further comprising tracking the presenter's current slide to keep the viewer aware of the presenter's position in the presentation.

* * * * *